(12) United States Patent
Coxon

(10) Patent No.: US 9,994,989 B2
(45) Date of Patent: Jun. 12, 2018

(54) BALL JOINT FOR A WASHING MACHINE SUSPENSION SYSTEM

(71) Applicant: General Electric Company, Schenectady, NY (US)

(72) Inventor: David John Coxon, Louisville, KY (US)

(73) Assignee: HAIER US APPLIANCE SOLUTIONS INC., Wilmington, DE (US)

( * ) Notice: Subject to any disclaimer, the term of this patent is extended or adjusted under 35 U.S.C. 154(b) by 299 days.

(21) Appl. No.: 14/685,976

(22) Filed: Apr. 14, 2015

(65) Prior Publication Data

US 2016/0305057 A1     Oct. 20, 2016

(51) Int. Cl.
*D06F 37/26* (2006.01)
*F16C 11/06* (2006.01)
(Continued)

(52) U.S. Cl.
CPC ........ *D06F 37/268* (2013.01); *F16C 11/0604* (2013.01); *F16C 11/068* (2013.01);
(Continued)

(58) Field of Classification Search
CPC . F16C 11/0614; F16C 11/0619; F16C 11/069; F16C 11/106; F16C 33/1065; F16C 33/6659; F16C 11/068; F16C 11/06–11/086; Y10T 403/32032; Y10T 403/32196; Y10T 403/32565; Y10T 403/32576; Y10T 403/32622; Y10T 403/32639; Y10T 403/32311;
(Continued)

(56) References Cited

U.S. PATENT DOCUMENTS 4,455,108 A * 6/1984 Lausberg .............. B63B 21/502
                                                    285/261
4,938,121 A * 7/1990 Melchior .................. F16J 1/22
                                                    384/206
(Continued)

FOREIGN PATENT DOCUMENTS

| JP | 11244573 A | 9/1999 | |
| KR | 100259155 B1 | 6/2000 | |
| KR | 20010036608 A | 5/2001 | |
| WO | WO 2010121610 A1 * | 10/2010 | .......... F16C 11/0604 |

*Primary Examiner* — Josh Skroupa
*Assistant Examiner* — Cory B Siegert
(74) *Attorney, Agent, or Firm* — Dority & Manning, P.A.

(57) ABSTRACT

A ball joint for use within a washing machine suspension system may generally comprise a joint body including a lower portion and an upper portion. The lower portion may define an outer surface having a curved profile. In addition, the joint body may define at least one lubrication inlet port extending between the upper and lower portions and at least one lubrication channel extending circumferentially around at least a portion of the lower portion along the outer surface. The lubrication channel(s) may be in fluid communication with the lubrication inlet port(s) such that, when a lubricant is injected into the lubrication inlet port(s) at the upper portion of the joint body, the lubricant flows from the lubrication inlet port(s) into the lubrication channel(s) and then flows circumferentially within the lubrication channel(s) along the outer surface.

20 Claims, 8 Drawing Sheets

(51) Int. Cl.
*F16C 33/10* (2006.01)
*D06F 39/12* (2006.01)
*D06F 37/24* (2006.01)

(52) U.S. Cl.
CPC .............. *D06F 37/24* (2013.01); *D06F 39/12* (2013.01); *F16C 11/0695* (2013.01); *F16C 33/102* (2013.01); *F16C 2340/00* (2013.01); *Y10T 403/32631* (2015.01)

(58) Field of Classification Search
CPC ..... Y10T 403/32656; Y10T 403/32573; Y10T 403/32631–403/32811
USPC ..................... 403/56, 76, 114, 115, 122–144
See application file for complete search history.

(56) References Cited

U.S. PATENT DOCUMENTS

| | | | |
|---|---|---|---|
| 5,011,320 A * | 4/1991 | Love | F16C 11/068 403/132 |
| 5,606,879 A | 3/1997 | Froelicher et al. | |
| 5,884,891 A * | 3/1999 | Hawkins | D06F 37/24 248/288.31 |
| 8,678,656 B2 * | 3/2014 | Richter | F16C 11/0638 384/213 |
| 9,297,104 B2 * | 3/2016 | Wong | D06F 37/22 |
| 2013/0022388 A1 * | 1/2013 | Carli | B62D 7/18 403/39 |

* cited by examiner

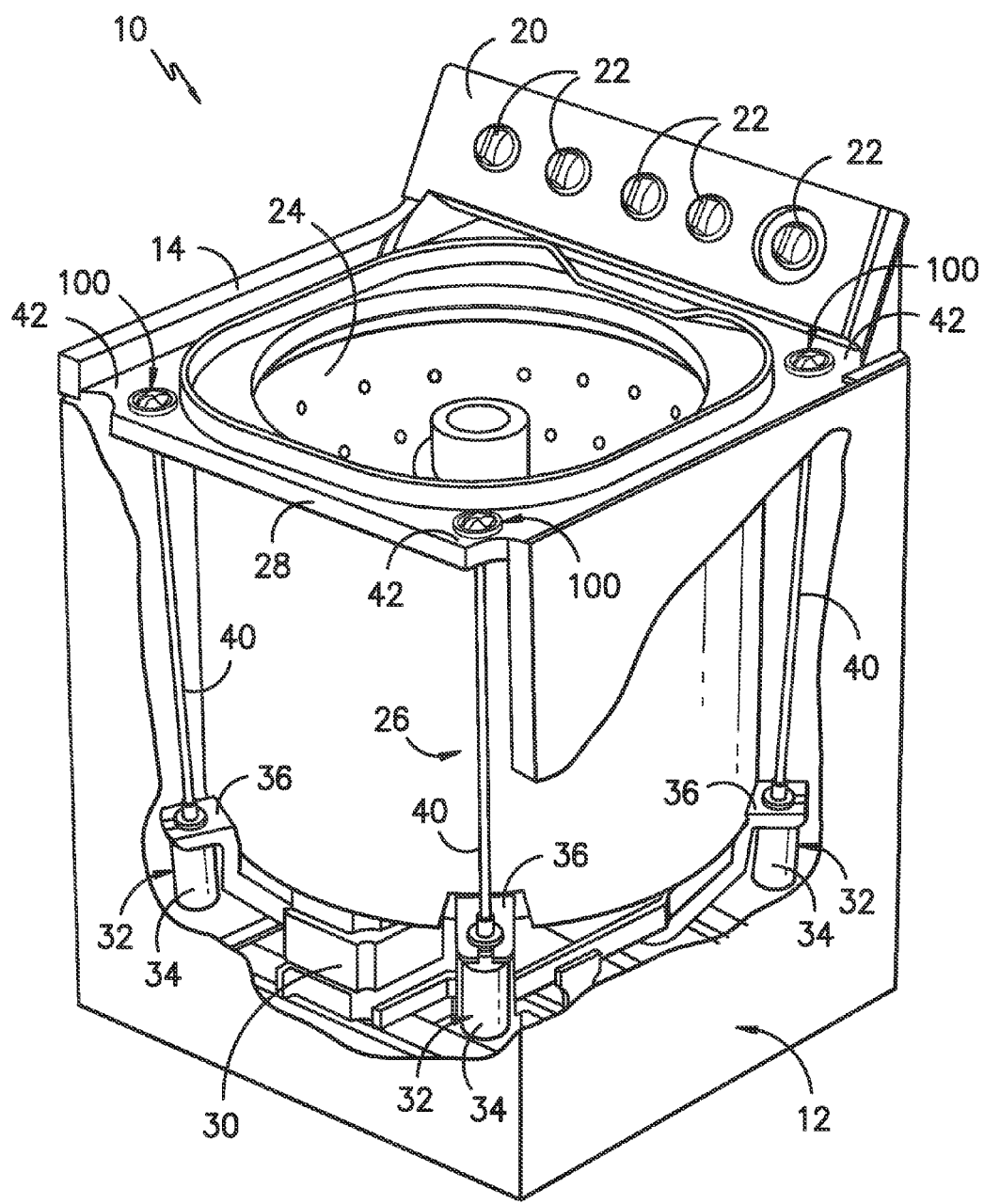
FIG. -1-

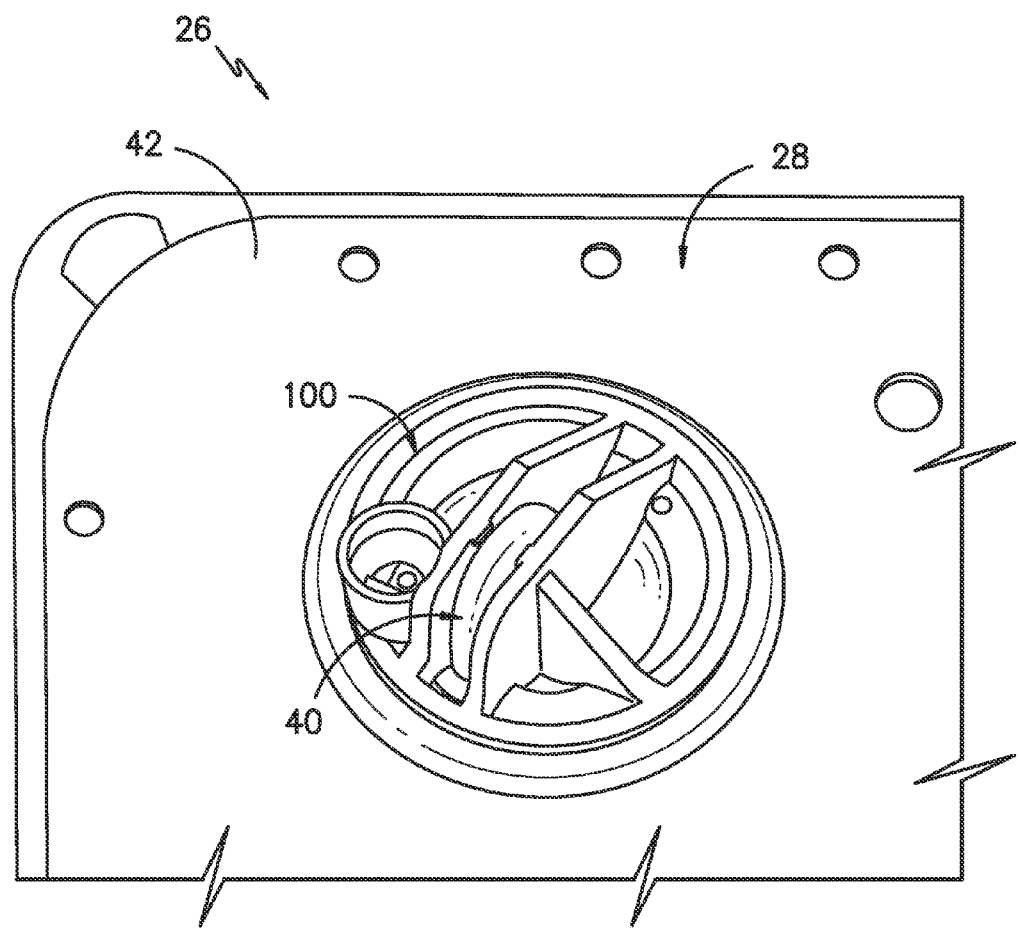
FIG. -2-

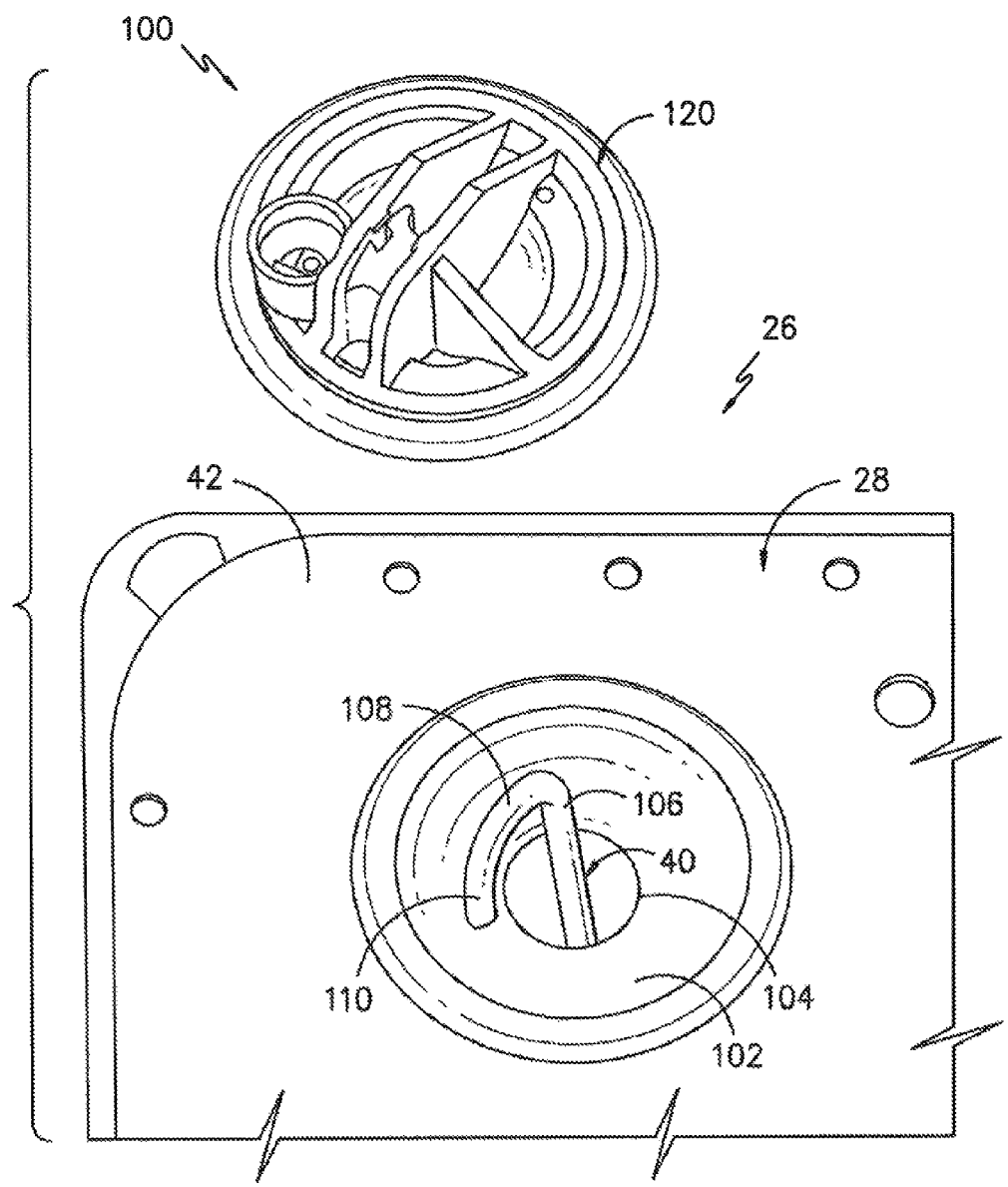
FIG. -3-

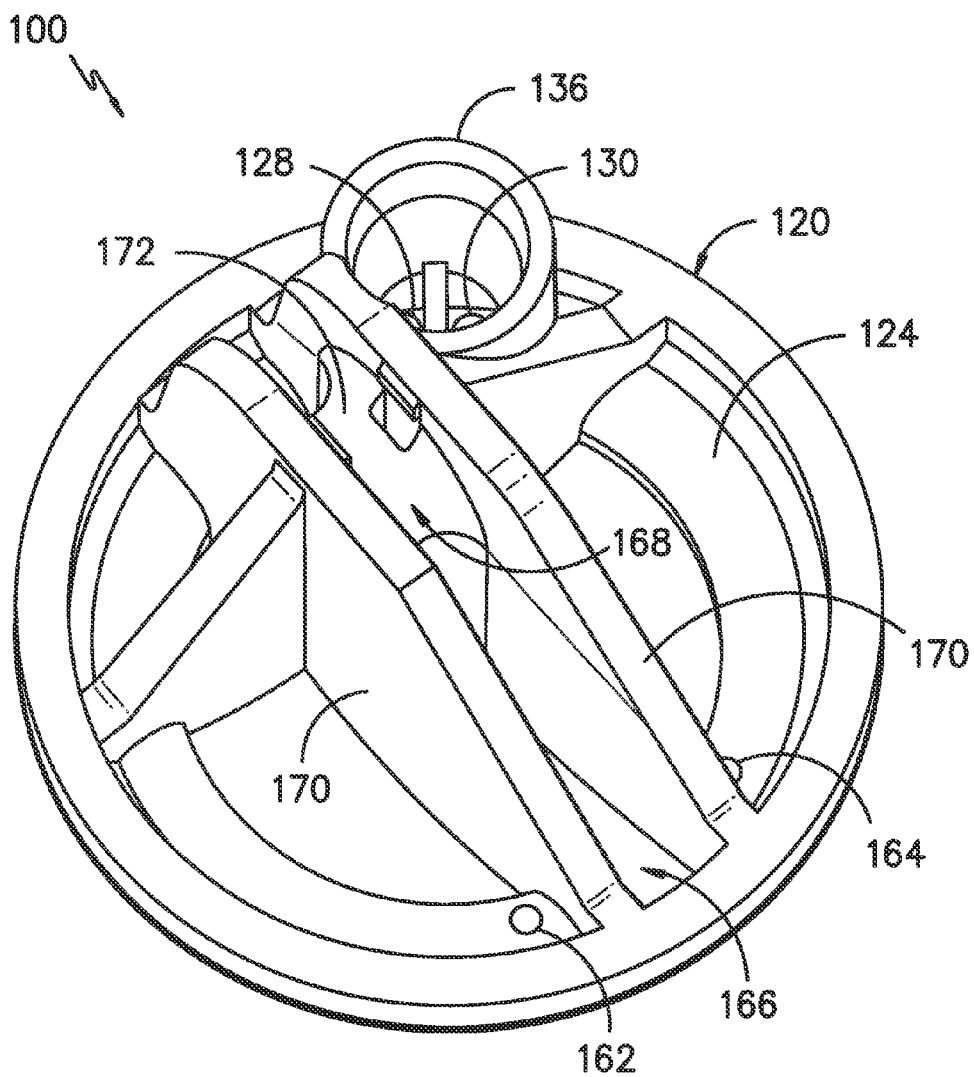
FIG. -4-

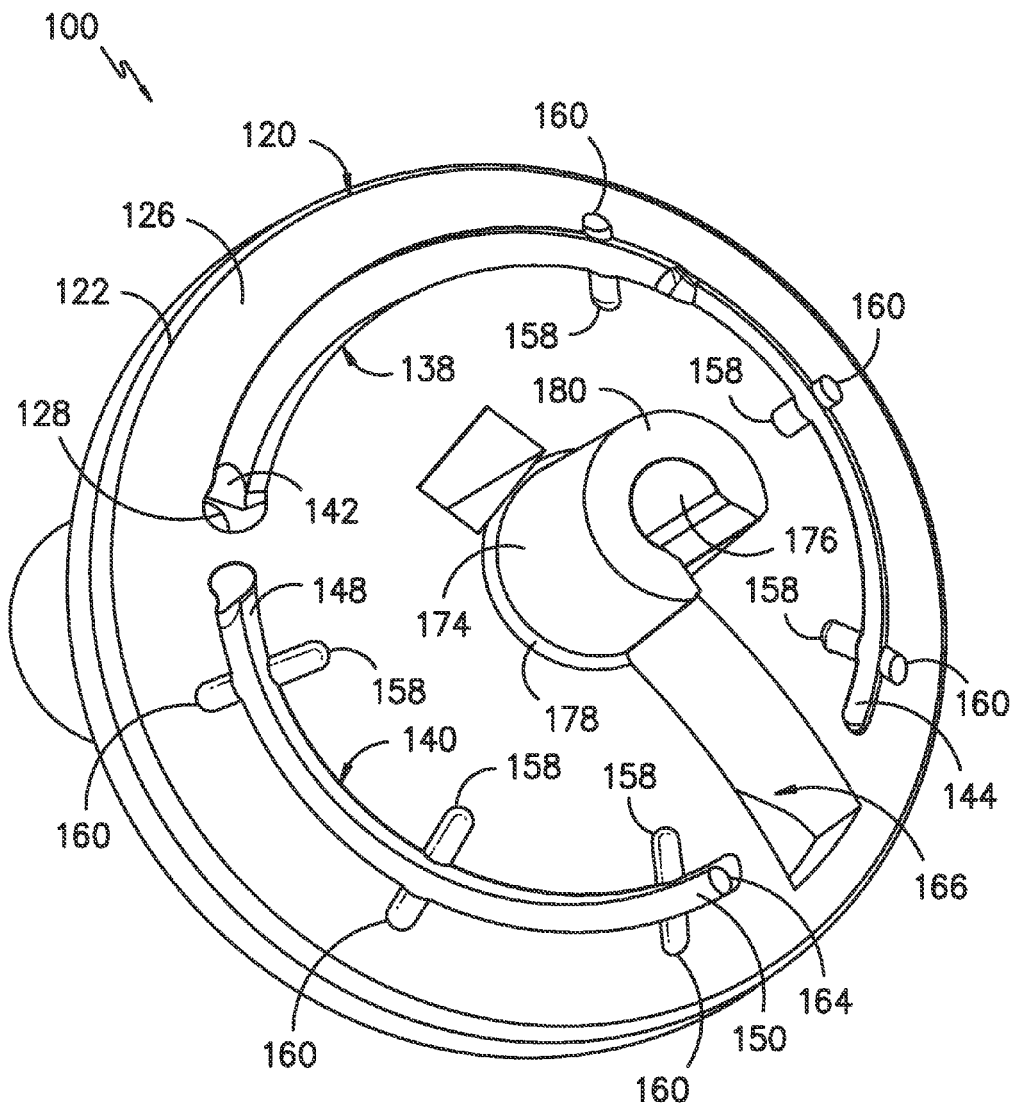
FIG. -5-

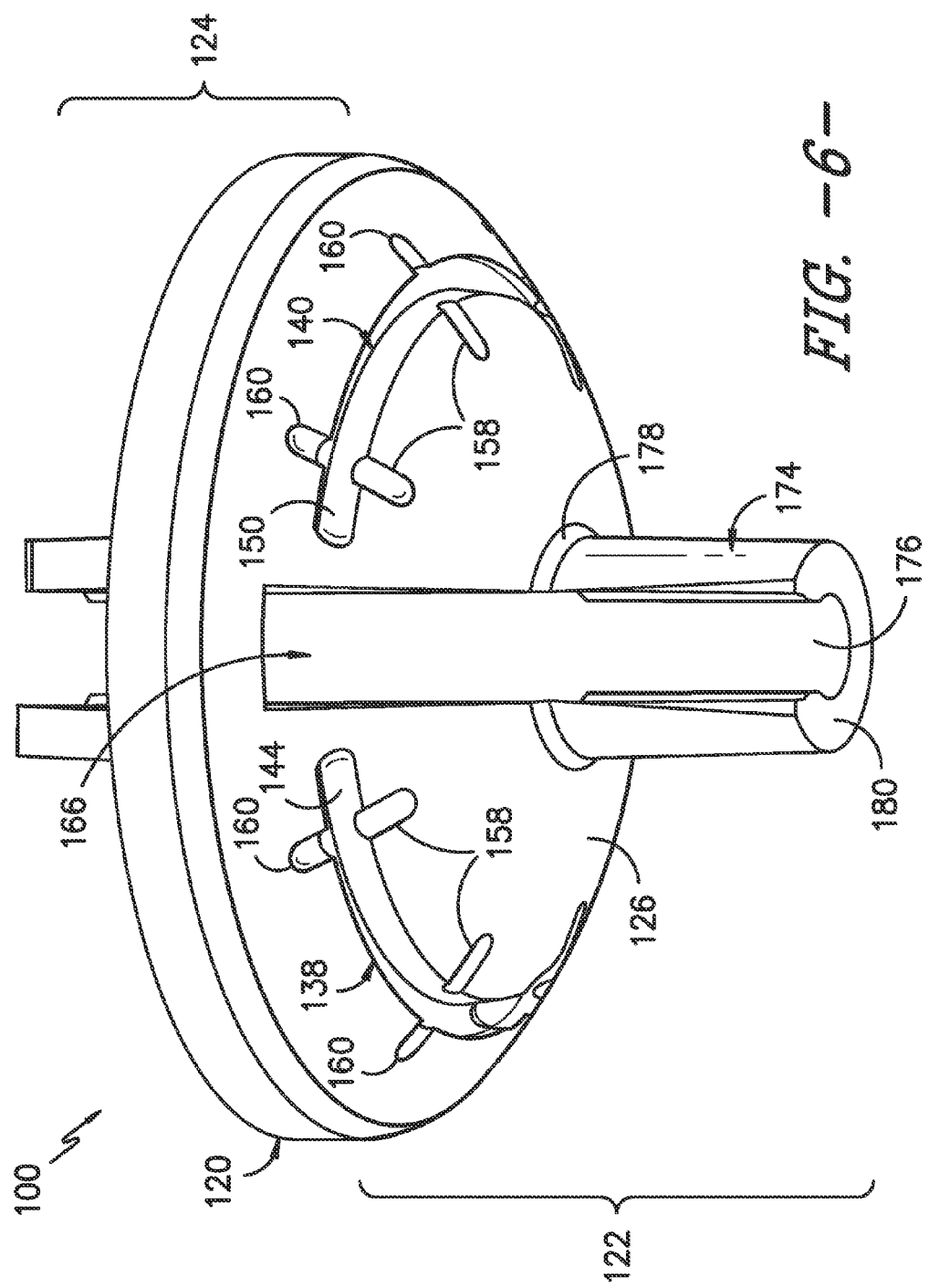
FIG. -6-

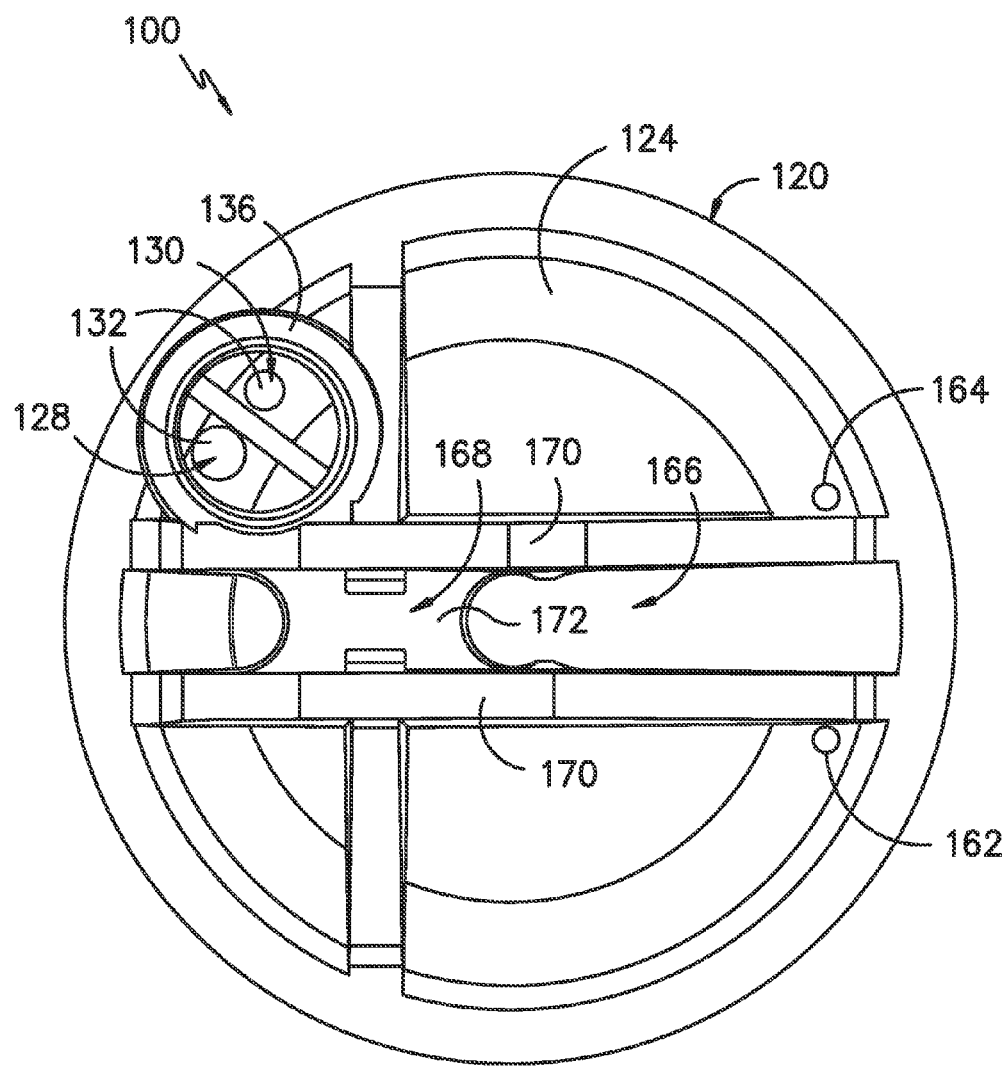
FIG. -7-

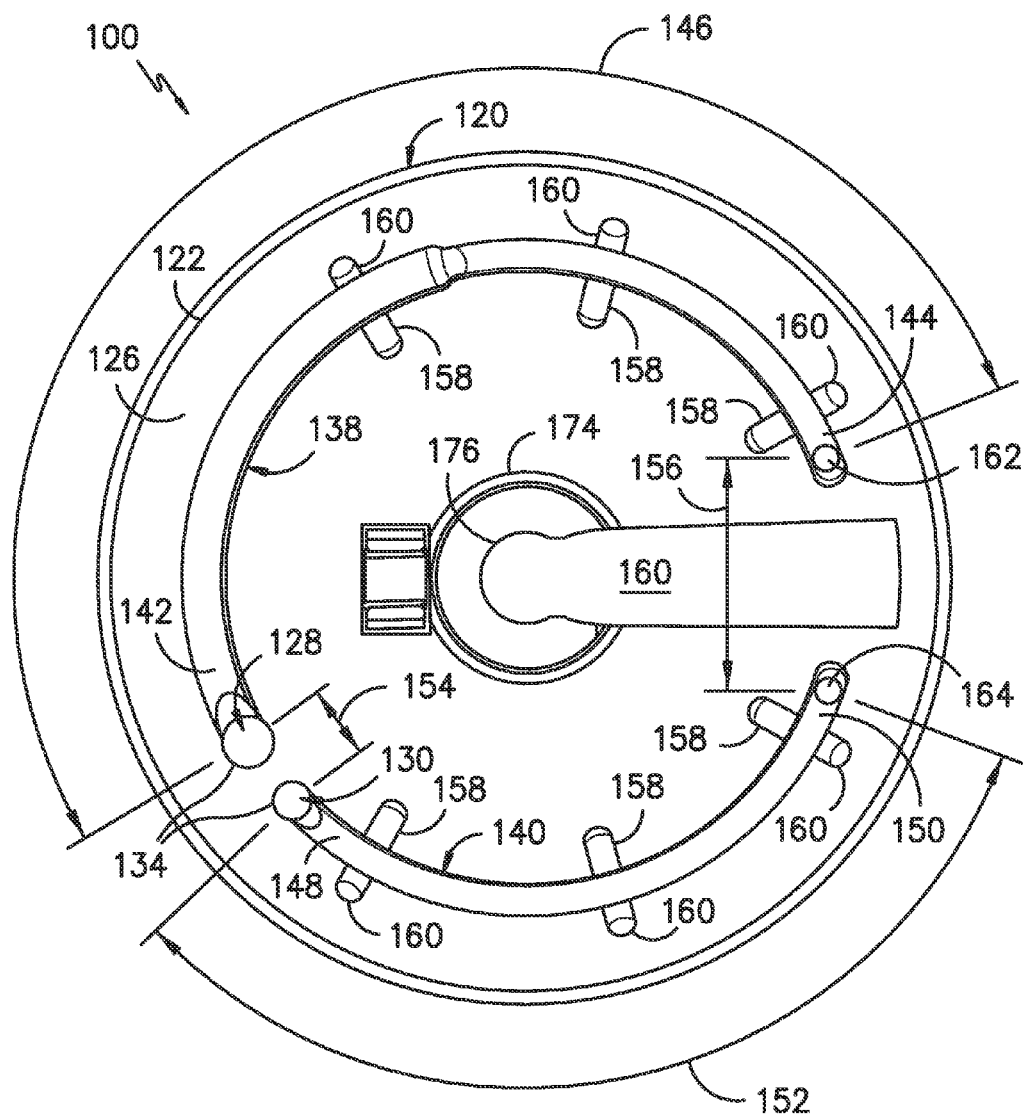
FIG. -8-

BALL JOINT FOR A WASHING MACHINE SUSPENSION SYSTEM

FIELD OF THE INVENTION

The present subject matter relates generally to washing machines and, more particularly, to an improved ball joint design for a washing machine suspension system that allows the joint to be lubricated post assembly of the suspension system.

BACKGROUND OF THE INVENTION

Conventional washing machines typically include a suspension system for suspending a wash tub and other components, such as a basket, a motor, and a transmission, within a cabinet and for damping movement of the wash tub and the basket. Known suspension systems include an upper frame and a lower frame. The upper frame is secured to, and supported by, the cabinet. The lower frame is coupled to the upper frame and is movable relative to the upper frame. Typically, the wash tub, basket, motor and transmission are coupled to the lower frame.

Additionally, conventional suspension systems often include suspension rods that extend from the lower frame to the upper frame. Typically, the suspension rods are secured, at their lower ends, to cylinder and piston assemblies mounted to the lower frame so that the lower frame can move relative to the suspension rods, which allows for damping of the wash tub and basket movement. In addition, the suspension rods are typically secured, at their upper ends, to the upper frame. For example, the upper end of each suspension rod is often secured to the upper frame via a plastic ball joint positioned within a corresponding joint cup defined in the upper frame.

To reduce friction between the ball joint and the joint cup and to prevent wear on the joint, the interface between the ball joint and the cup must often be lubricated. For conventional suspension systems, such lubrication must occur prior to the ball joint being assembled within the joint cup. Specifically, assembly workers must typically pre-apply an amount of lubricant within the recess defined by the joint cup. Following the application of lubricant within each joint cup, the ball joint and suspension rod are then assembled relative to the joint cup. Unfortunately, such pre-application of the lubricant typically requires the use of assembly aids or other assembly features to keep other components away from the pre-lubricated joint cup as an the operator assembles the components.

Accordingly, an improved ball joint design for a washing machine suspension system that allows the joint to be lubricated post assembly of the suspension system would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a suspension system for a washing machine. The suspension system may generally include a frame member defining a joint recess having a curved profile, wherein the joint recess defines a rod opening. In addition, the suspension system may include a suspension rod including an upper end configured to be inserted through the rod opening and a ball joint configured to vertically support the suspension rod relative to the frame member. The ball joint may generally comprise a joint body including a lower portion configured to be seated within the joint recess and an upper portion opposite the lower portion. The lower portion may define an outer surface having a curved profile generally corresponding to the curved profile of the joint recess. Additionally, the joint body may define at least one lubrication inlet port extending between the upper and lower portions and at least one lubrication channel extending circumferentially around at least a portion of the lower portion along the outer surface. The lubrication inlet port(s) may be in fluid communication with the lubrication channel(s) such that, when a lubricant is injected into the lubrication inlet port(s) at the upper portion of the joint body, the lubricant flows from the lubrication inlet port(s) into the lubrication channel(s) and then flows circumferentially within the lubrication channel(s) along the outer surface so as to lubricate an interface defined between the joint recess and the lower portion of the joint body.

In another aspect, the present subject matter is directed to a ball joint for use within a suspension system of a washing machine. The ball joint may generally comprise a joint body including a lower portion and an upper portion opposite the lower portion. The lower portion may define an outer surface having a curved profile. In addition, the joint body may define first and second lubrication inlet ports extending between the upper and lower portions and first and second lubrication channels extending circumferentially around at least a portion of the lower portion along the outer surface. The first lubrication channel may be in fluid communication with the first lubrication inlet port and the second lubrication channel may be in fluid communication with the second lubrication inlet port such that, when a lubricant is injected into the first and second lubrication inlet ports at the upper portion of the joint body, the lubricant flows from the first and second lubrication inlet ports into the first and second lubrication channels and then flows circumferentially within the first and second lubrication channels along the outer surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a washing machine in accordance with aspects of the present subject matter, particularly illustrating portions of the machine cut-away to allow components of a suspension system of the washing machine to be shown;

FIG. 2 illustrates a partial, perspective of one embodiment of components suitable for use within the suspension system shown in FIG. 1 in accordance with aspects of the present subject matter, particularly illustrating a ball joint and suspension rod of the suspension system installed within a joint recess defined by an upper frame member of the suspension system;

FIG. 3 illustrates another perspective view of the system components shown in FIG. 2, particularly illustrating the ball joint exploded away from the joint recess;

FIG. 4 illustrates a top perspective of one embodiment of a ball joint suitable for use within the disclosed suspension system in accordance with aspects of the present subject matter;

FIG. 5 illustrates a bottom perspective view of the ball joint shown in FIG. 4;

FIG. 6 illustrates a side perspective view of the ball joint shown in FIG. 4;

FIG. 7 illustrates a top view of the ball joint shown in FIG. 4; and

FIG. 8 illustrates a bottom view of the ball joint shown in FIG. 4.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved ball joint design to be used within a suspension system for a washing machine. Specifically, in several embodiments, the ball joint includes various lubrication features for allowing a lubricant to be supplied to an interface defined between the joint and its corresponding joint cup or recess after the joint has been installed within the recess. For example, as will be described below, the ball joint may include one or more lubrication inlet ports extending from a top or upper side of the joint to one or more corresponding lubrication channels extending circumferentially along a curved outer surface of the joint. The curved outer surface may generally be configured to define the hemi-spherically shaped bottom or lower side of the joint that mates with or is otherwise received within the joint recess. In addition, the ball joint may include a plurality of radial lubrication channels extending radially inwardly and/or radially outwardly from the circumferential lubrication channel(s) along the curved outer surface. As such, when lubricant is injected into the lubrication inlet port(s) along the upper side of the ball joint, the lubricant may flow through the inlet port(s) and into the lubrication channel(s) defined along the curved outer surface. The lubricant may then flow circumferentially along the length of the lubrication channel(s) and may also be directed radially from the circumferential lubrication channel(s) to the radial lubrication channel(s) to allow the lubricant to be dispersed across the interface defined between the ball joint and its corresponding cup recess.

Moreover, as will be described below, the joint body may also define one or more lubrication outlet ports that extend from the bottom side of the joint body to its top side. The lubrication outlet port(s) may be in fluid communication with the lubrication channel(s) along the bottom side of the joint body. As such, when lubricant is supplied through the lubrication inlet port(s) and into the lubrication channel(s), any excess lubricant may flow from the lubrication channel(s) via the outlet port(s) to the top side of the joint body. Such a flow of excess lubricant to the top side of the joint body may provide a visual indication that the ball joint has been properly lubricated.

Referring now to the drawings, FIG. 1 illustrates a perspective view of one embodiment of a washing machine 10 in accordance with aspects of the present subject matter, particularly illustrating portions of the washing machine 10 being cut away to illustrate internal components of the machine 10. It should be appreciated that the specific configuration of the washing machine 10 shown in FIG. 1 is simply provided for purposes of illustration. In other embodiments, the disclosed suspension system may be utilized in any other washing machine having any other suitable configuration.

In general, the washing machine 10 may include a cabinet 12 having a washer cover 14 (primarily cut-away in the view of FIG. 1) and a lid (not shown) configured to be pivotally mounted to the washer cover 14. Additionally, as shown in FIG. 1, the washing machine 10 also includes a control panel 20 having a plurality of control knobs 22 for controlling the operation of the machine 10.

Moreover, a wash tub 24 of the machine 10 may be configured to be supported within the cabinet 12 via a suspension system 26. In general, the suspension system 26 may include an upper frame member 28 secured to the cabinet 12 and a lower frame member 30 movable relative to upper frame member 28. In several embodiments, the wash tub 24 and one or more other components of the machine 10 (e.g., the basket, motor and transmission of the machine 10 (not shown)) may be secured to lower frame member 30 so that the wash tub 24 and such other component(s) are also movable relative to the upper frame member 28. As is generally understood, loads associated with the tub 24 may be supported by the cabinet 12 via the suspension system 26.

To damp wash tub movement, the suspension system 26 may also include a damper assembly 32 mounted to the lower frame member 30. Specifically, in several embodiments, the damper assembly 32 may include a cylinder 34 configured to be secured to a brace 36 of the lower frame member 30 at each corner of the lower frame member 30 (only three of the four corners of the lower frame member 30 being shown in FIG. 1). In such embodiments, a piston (not shown), such as a spring-based piston or any other suitable piston type, may be located within each cylinder 34, with each piston being secured to a corresponding suspension rod 40. As shown in FIG. 1, the suspension rod 40 may be configured to extend upwardly from the damper assembly 32 through an opening (not shown in FIG. 1) defined in the upper frame member 28 at or adjacent to each of its corners 42 (only three of the four corners 42 of the lower frame member 28 being shown in FIG. 1). As will be described below, the suspension rod 40 may be coupled to the upper frame member 28 via a suitable ball joint 100 configured in accordance with aspects of the present subject matter.

It should be appreciated that, although the damper assembly 32 was described above as comprising a piston/cylinder assembly, the damper assembly 32 may generally include any other suitable component(s) that facilitate damping of the wash tub movement.

Referring now to FIGS. 2 and 3, perspective views of several of the components of the suspension system 26 described above are illustrated in accordance with aspects of the present subject matter. Specifically, FIG. 2 illustrates an assembled view of one of the ball joints 100 and suspension rods 40 described above as installed relative to a portion of the upper frame member 28. Additionally, FIG. 3 illustrates an exploded view of the ball joint 100 and the suspension rod 40 shown in FIG. 2.

As shown in the illustrated embodiment, the upper frame member 28 may be configured to define a cup or joint recess 102 for receiving the ball joint 100. Specifically, in several embodiments, the joint recess 102 may have a generally curved profile defining a hemi-spherical shape configured to receive a corresponding hemi-spherically shaped portion of the ball joint 100. As such, when the ball joint 100 is inserted within the joint recess 102, the mating curved profiles of the ball joint 100 and the joint recess 102 may allow the ball joint 100 to move or slide relative to the joint recess 102 along the curved interface defined between such components.

Additionally, as shown particularly shown in FIG. 3, a rod opening 104 is defined through the upper frame member 28 at the bottom of the joint recess 102 that is configured to receive an upper end 106 of the suspension rod 40. Specifically, when assembling the disclosed suspension system 26, the upper end 106 of the suspension rod 40 may be inserted through both the rod opening 104 and a portion of the ball joint 100 such that the upper end 106 engages the ball joint 100 along its top side. For example, as shown in the illustrated embodiment, the upper end 106 of the suspension rod 40 is bent or curved so as to include a top portion 108 and a side portion 110 extending from the top portion 108 so as to define a hooked shape. As will be described below, the ball joint 100 may include suitable features configured to receive and/or be engaged with the hooked upper end 106 of the suspension rod 40, thereby allowing the ball joint 100 to vertically support the suspension rod 40 relative to the upper frame member 28.

Referring now to FIGS. 4-8, several views of the ball joint 100 described above with reference to FIGS. 1-3 are illustrated in accordance with aspects of the present subject matter. Specifically, FIGS. 4 and 5 illustrate top and bottom perspective views, respectively, of the ball joint 100. FIG. 6 illustrates a side perspective view of the ball joint 100 shown in FIGS. 4 and 5. Additionally, FIGS. 7 and 8 illustrates top and bottom views, respectively, of the ball joint 100 shown in FIGS. 4 and 5.

As shown in the illustrated embodiment, the ball joint 100 is generally includes a joint body 120 having a lower portion 122 configured to be received within the joint recess 102 defined by the upper frame member 28 and an upper portion 124 opposite the lower portion 122 that is configured to extend outwardly from the joint recess 102 and engage the hooked upper end 106 of the suspension rod 40. In general, the lower portion 122 of the joint body 120 may define an outer surface 126 having a curved profile generally corresponding to the curved profile of the joint recess 102. For example, in several embodiments, the outer surface 126 may define a hemi-spherical shape that generally matches the hemi-spherical shape of the joint recess 102, thereby allowing for a mating, curved interface to be defined between the lower portion 122 of the joint body 120 and the joint recess 102 when the ball joint 100 is installed within the recess 102.

Additionally, as particularly shown in FIGS. 7 and 8, the joint body 120 may define first and second lubrication inlet ports 128, 130 extending vertically between the upper and lower portions 124, 122 of the joint body 120, with each inlet port 128, 130 including an upper end 132 (FIG. 7) and a lower end 134 (FIG. 8). Specifically, in several embodiments, the inlet ports 128, 130 may be defined through the joint body 120 such that the upper end 128 of each inlet port 128, 130 terminates at the upper portion 124 of the joint body 120 (e.g., as shown in FIG. 7) and the lower end 134 of each inlet port 128, 130 terminates at the lower portion 122 of the joint body 120 (e.g., as shown in FIG. 8). As such, lubricant injected through the inlet ports 138, 130 may be directed through the ball joint 100 from the upper portion 124 of the joint body 120 to the lower portion 122 of the joint body 120.

It should be appreciated that, in several embodiments, the joint body 120 may include any suitable feature(s) that assists in injecting lubricant into and through the inlet ports 128, 130. For example, as shown in the illustrated embodiment, the joint body 120 includes a lubricant injection tube 136 extending vertically from the upper ends 132 of the inlet ports 128, 130 along the upper portion 124 of the joint body 120. In such an embodiment, the lubricant injection tube 136 may be configured to receive the tip end or nozzle outlet of suitable grease injection equipment (not shown), such as commercial grade bulk dispense grease injection equipment, a grease gun and/or any other suitable device that is being used to inject lubricant into the inlet ports 128, 130. For example, the nozzle outlet of the grease injection equipment may be inserted into the lubricant injection tube 136 such that, when grease or any other suitable lubricant is expelled from the nozzle outlet, the lubricant flows downward to the bottom of the tube 136 and through the upper ends 132 of the inlet ports 128, 130.

It should also be appreciated that the lubricant injection tube 136 may be configured to include any suitable feature that allows the nozzle outlet of the grease injection equipment being used to inject lubricant into the inlet ports 128, 130 to be inserted therein in a manner that prevents the lubricant from flowing back around the nozzle outlet and out the top end of the lubricant injection tube 136. For example, in one embodiment, the lubricant injection tube 136 may be tapered inwardly (e.g., at an angle ranging from one to five degrees) such that a small amount of force is required to insert the nozzle outlet of the grease injection equipment into the lubricant injection tube 136.

Moreover, the joint body 120 may also define first and second lubricant channels 138, 140 extending circumferentially around sections of the lower portion 122 of the joint body 122 along its outer surface 126. As particularly shown in FIG. 8, the first lubricant channel 138 may be configured to extend lengthwise between a first inlet end 142 and a first outlet end 144 along a first circumferential section 146 of the lower portion 122 of the joint body 120. Similarly, the second lubricant channel 140 may be configured to extend lengthwise between a second inlet end 148 and a second outlet end 150 along a second circumferential section 152 of the lower portion 122 of the joint body 120. In several embodiments, the first and second lubricant channels 138, 140 may define separate, spaced apart channels along the lower portion 122 of the joint body 120. In such embodiments, as shown in FIG. 8, the lubricant channels 128, 130 may be separated from one another such that the first and second inlet ends 142, 148 of the lubricant channels 128, 130 are spaced apart from one another circumferentially by a first distance 154 and the first and second outlet ends 144, 150 of the lubricant channels 128, 130 are spaced apart from one another circumferentially by a second distance 156. However, in alternative embodiments, the lubricant channels 128, 130 may be joined at one or both of their ends so as to define a common lubricant channel extending circumferentially around the lower portion 122 of the joint body 120.

As particularly shown in FIGS. 5 and 8, each lubrication channel 138, 140 may be configured to be in fluid communication with one of the inlet ports 128, 130 for supplying lubricant through the channels 138, 140. Specifically, in several embodiments, the first inlet end 142 of the first lubrication channel 138 may be configured to be in direct fluid communication with the lower end 134 of the first lubrication inlet port 128. Similarly, the second inlet end 148 of the second lubrication channel 140 may be configured to be in direct fluid communication with the lower end 134 of the second lubrication inlet port 130. As such, when lubricant is supplied through the inlet ports 128, 130, the lubricant may be directed from each inlet port 128, 130 to its respective lubricant channel 138, 140 and subsequently flow circumferentially around the lower portion of the joint body 128, from the inlet end 142, 148 to the outlet end 144, 150 of each channel 138, 140.

Additionally, in several embodiments, a plurality of radial channels 158, 160 may be defined in the lower portion 122 of the joint body 120 that extend radially from each circumferential lubrication channel 138, 140. Specifically, as shown in FIGS. 6 and 8, a plurality of first radial channels 158 may be defined in the lower portion 122 so as to extend radially inwardly from each lubrication channel 138, 140. In addition, a plurality of second radial channels 160 may be defined in the lower portion 122 so as to extend radially outwardly from each lubrication channel 138, 140. Thus, as lubricant is directed lengthwise along each circumferential lubrication channel 138, 140 between its inlet and outlet ends, a portion of the lubricant may flow into the radial channels 158, 160 to allow the lubricant to be dispersed radially along the interface defined between the joint recess 102 and the outer surface 126 of the lower portion 122 of the joint body 120.

Moreover, as particularly shown in FIGS. 7 and 8, first and second lubrication outlet ports 162, 164 may also be defined in the ball joint 100 that extend between the upper and lower portions 124, 122 of the joint body 120. Specifically, as shown, the first outlet port 162 may be defined in the joint body 120 so as to be in direct fluid communication with the outlet end 144 of the first lubrication channel 138. Similarly, the second outlet port 164 may be defined in the joint body 120 so as to be in direct fluid communication with the outlet end 150 of the second lubrication channel 140. As such, when lubricant is injected into the inlet ports 128, 130 and flows through the lubrication channels 138, 140 (including the radial channels 158, 160), any excess lubricant may be directed into the outlet ports 162, 164 at the outlet ends 142, 144 of the lubrication channels 138, 140. Such excess lubricant may then travel through the outlet ports 162, 164 and flow outwardly therefrom along the upper portion 124 of the joint body 120, which may provide a visual indication that the ball joint 100 has been properly lubricated and the supply of lubricant to the joint 102 can be stopped.

As indicated above, during assembly of the disclosed suspension system, the hooked upper end 106 of the suspension rod 40 may be configured to be inserted through a portion of the ball joint 100. For example, as shown in FIGS. 4-8, the ball joint 100 may include a rod insertion channel 166 defined in the joint body 120 between its upper and lower portions 124, 122 that is configured to receive the upper end 106 of the suspension rod 40. In such an embodiment, the rod insertion channel 166 may be appropriately sized to allow the upper end 106 of the suspension rod 40 to be inserted into the channel 166 at the lower portion 122 of the joint body 120 and pushed through the joint body 120 to a location above the upper portion 124 of the joint body 120.

Additionally, as shown in the illustrated embodiment, a hook groove 168 may also be defined adjacent to the upper portion 124 of the joint body 120 that extends from the rod insertion channel 166. Specifically, as shown in FIGS. 7 and 7, the hook groove 168 may be defined widthwise between opposed hook walls 170 so as to extend vertically above a retainer wall 172 positioned adjacent to the rod insertion channel 166 along the upper portion 124 of the joint body 120. Thus, when the upper end 106 of the suspension rod 40 is inserted through the rod insertion channel 166, the upper end 106 may be hooked over the retainer wall 172 such that the top portion 108 of the upper end 106 extends between the hook walls 170 along the hook groove 168 and the side portion 110 of the upper end 106 extends along the side of the retainer wall 172 opposite the rod insertion channel 166, thereby providing a means for vertically retaining the suspension rod 40 relative to the ball joint 100.

Moreover, in several embodiments, the ball joint 100 may also include a rod support arm 174 extending from the lower portion 122 of the joint body 120 at or adjacent to the rod insertion channel 166. For example, as particularly shown in FIG. 6, in one embodiment, a lower portion 176 of the rod insertion channel 166 may be defined in the rod support arm 174, such as from a top end 178 of the support arm 174 to a bottom end 180 of the support arm 174. Thus, when the upper end 106 of the suspension rod 40 is hooked around the retainer wall 172, a portion of the rod 40 may extend through the lower portion 176 of the rod insertion channel 162 between the top and bottom ends 178, 180 of the support arm 174.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A suspension system for a washing machine, the system comprising:
   a frame member defining a joint recess having a curved profile, the joint recess defining a rod opening;
   a suspension rod including an upper end configured to be inserted through the rod opening; and
   a ball joint configured to vertically support the suspension rod relative to the frame member, the ball joint comprising:
   a joint body including a lower portion configured to be seated within the joint recess and an upper portion opposite the lower portion, the lower portion defining an outer surface having a curved profile corresponding to the curved profile of the joint recess, the joint body defining at least one lubrication inlet port extending between the upper and lower portions and at least one lubrication channel extending circumferentially around at least a portion of the lower portion along the outer surface between an inlet end in direct fluid communication with the at least one lubrication inlet port and an outlet end opposite the inlet end,
   wherein the at least one lubrication inlet port is in fluid communication with the at least one lubrication channel such that, when a lubricant is injected into the at least one lubrication inlet port at the upper portion of the joint body, the lubricant flows from the at least one lubrication inlet port into the at least one lubrication channel and then flows circumferentially within the at least one lubrication channel along the outer surface so as to lubricate an interface defined between the joint recess and the lower portion of the joint body, wherein the joint body further defines at least one lubrication outlet port extending between the upper and lower portions, the at least one lubrication outlet port being in direct fluid communication with the outlet end of the at least one lubrication channel such that, when the lubricant is supplied through the at least one lubrication channel, excess lubricant is directed through the at least one lubrication outlet port to an outer surface of the upper portion of the joint body so as to be expelled from the upper portion along an exterior of the joint body.

2. The suspension system of claim 1, wherein the at least one lubrication inlet port comprises a first inlet port and a second inlet port separate from the first inlet port, each of the first and second inlet ports extending from an upper end adjacent to the upper portion of the joint body to a lower end adjacent to the lower portion of the joint body.

3. The suspension system of claim 2, wherein the at least one lubrication channel comprises a first lubrication channel and a second lubrication channel, the first lubrication channel extending circumferentially along the outer surface between a first inlet end and a first outlet end, the first inlet end being in fluid communication with the lower end of the first inlet port, the second lubrication channel extending circumferentially along the outer surface between a second inlet end and a second outlet end, the second inlet end being in fluid communication with the lower end of the second inlet port.

4. The suspension system of claim 3, wherein the first and second inlet ends of the first and second lubrication channels are spaced apart circumferentially from one another along the outer surface.

5. The suspension system of claim 3, wherein the first and second outlet ends of the first and second lubrication channels are spaced apart circumferentially from one another along the outer surface.

6. The suspension system of claim 1, wherein the joint body further defines a plurality of radial lubrication channels extending radially from the at least one lubrication channel along the outer surface.

7. The suspension system of claim 6, wherein the plurality of radial lubrication channels comprises a first radial lubrication channel extending radially outwardly from the at least one lubrication channel along the outer surface and a second radial lubrication channel extending radially inwardly from the at least one lubrication channel along the outer surface.

8. The suspension system of claim 1, further comprising a lubricant injection tube extending outwardly from the at least one lubrication inlet port along the upper portion of the joint body.

9. The suspension system of claim 1, wherein the joint body further defines a rod insertion channel extending between the upper and lower portions of the joint body, the upper end of the suspension rod being configured to be inserted through the rod insertion channel to allow the upper end to be engaged along the upper portion of the joint body.

10. The suspension system of claim 9, wherein a groove is defined along the upper portion of the joint body that extends from the rod insertion channel, the groove being defined vertically above a retainer wall extending adjacent to the rod insertion channel, wherein the upper end of the suspension rod is configured to be received within groove such that a portion of the upper end is hooked around the retainer wall.

11. The suspension system of claim 9, further comprising a rod support arm extending from the lower portion of the joint body, a portion of the rod insertion channel being defined in the rod support arm.

12. A ball joint for use within a suspension system of a washing machine, the ball joint comprising:

a joint body including a lower portion and an upper portion opposite the lower portion, the lower portion defining an outer surface having a curved profile, the joint body defining first and second lubrication inlet ports extending between the upper and lower portions, the joint body further defining first and second lubrication channels extending circumferentially around at least a portion of the lower portion along the outer surface, the first lubrication channel extending between a first inlet end in direct fluid communication with the first lubrication inlet port and a first outlet end opposite the first inlet end, the second lubrication channel extending between a second inlet end in direct fluid communication with the second lubrication inlet port and a second outlet end opposite the second inlet end, wherein, when a lubricant is injected into the first and second lubrication inlet ports at the upper portion of the joint body, the lubricant flows from the first and second lubrication inlet ports into the first and second lubrication channels and then flows circumferentially within the first and second lubrication channels along the outer surface, wherein the joint body further defines a first outlet port in direct fluid communication with the first outlet end of the first lubrication channel and a second outlet port in direct fluid communication with the second outlet end of the second lubrication channel such that, when the lubricant is supplied through the first and second lubrication channels, excess lubricant is directed through the first and second outlet ports to an outer surface of the upper portion of the joint body so as to be expelled from the upper portion along an exterior of the joint body.

13. The ball joint of claim 12, wherein each of the first and second lubrication inlet ports extend from an upper end adjacent to the upper portion of the joint body and a lower end adjacent to the lower portion of the joint body.

14. The ball joint of claim 13, wherein the first inlet end terminates at the lower end of the first lubrication inlet port such that the first inlet end is in direct fluid communication with the lower end of the first lubrication inlet port, the second inlet end terminates at the lower end of the second lubrication inlet port such that the second inlet end is in direct fluid communication with the lower end of the second lubrication inlet port.

15. The ball joint claim 14, wherein the first and second inlet ends of the first and second lubrication channels are spaced apart circumferentially from one another along the outer surface.

16. The ball joint of claim 14, wherein the first and second outlet ends of the first and second lubrication channels are spaced apart circumferentially from one another along the outer surface.

17. The ball joint of claim 13, wherein the joint body further defines a plurality of radial lubrication channels extending radially from the first and second lubrication channels along the outer surface.

18. The ball joint of claim 17, wherein the plurality of radial lubrication channels comprises at least one first radial lubrication channel extending radially outwardly from at least one of the first lubrication channel or the second lubrication channel along the outer surface and at least one second radial lubrication channel extending radially inwardly from at least one of the first lubrication channel or the second lubrication channel along the outer surface.

19. The suspension system of claim 1, wherein:
the at least one lubrication inlet port extends between the upper and lower portions such that an end of the at least one lubrication inlet port terminates at the inlet end of the at least one lubrication channel; and
the at least one lubrication outlet port extends between the upper and lower portions such that an end of the at least one lubrication outlet port terminates at the outlet end of the at least one lubrication channel.

20. The ball joint of claim 12, wherein each of the first and second lubrication outlet ports extend from an upper end adjacent to the upper portion of the joint body to a lower end adjacent to the lower portion of the joint body, the lower end of the first lubrication outlet port terminating at the outlet end of the first lubrication channel such that the lower end of the first lubrication outlet port is in direct fluid communication with the outlet end of the first lubrication channel, the lower end of the second lubrication outlet port terminating at the outlet end of the second lubrication channel such that the lower end of the second lubrication outlet port is in direct fluid communication with the outlet end of the second lubrication channel.

\* \* \* \* \*